US012676714B2

(12) United States Patent
Liu

(10) Patent No.: US 12,676,714 B2
(45) Date of Patent: Jul. 7, 2026

(54) TRS/CSI-RS CONFIGURATION METHOD AND APPARATUS

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 556 days.

(21) Appl. No.: 18/031,830

(22) PCT Filed: Oct. 16, 2020

(86) PCT No.: PCT/CN2020/121670
§ 371 (c)(1),
(2) Date: Apr. 13, 2023

(87) PCT Pub. No.: WO2022/077492
PCT Pub. Date: Apr. 21, 2022

(65) Prior Publication Data
US 2023/0388070 A1 Nov. 30, 2023

(51) Int. Cl.
*H04L 5/00* (2006.01)
(52) U.S. Cl.
CPC ................................... *H04L 5/0048* (2013.01)
(58) Field of Classification Search
CPC ...................................................... H04L 5/0048
See application file for complete search history.

(56) References Cited

U.S. PATENT DOCUMENTS

2013/0114535 A1* 5/2013 Ng .................... H04W 72/0446
370/329
2019/0058517 A1 2/2019 Kang et al.
(Continued)

FOREIGN PATENT DOCUMENTS

CN 109587771 A 4/2019
CN 109842937 A 6/2019
(Continued)

OTHER PUBLICATIONS

State Intellectual Property Office of the People's Republic of China, Office Action and Search Report Issued in Application No. 2020800027559, Mar. 16, 2023, 18 pages.
(Continued)

*Primary Examiner* — Duc C Ho
(74) *Attorney, Agent, or Firm* — Volpe Koenig

(57) ABSTRACT

TRS/CSI-RS configuration methods and apparatuses are provided, the TRS/CSI-RS configuration method may include: determining target configuration information from a plurality of pieces of preset TRS/CSI-RS configuration information, where the target configuration information is for configuring one or more TRSs/CSI-RSs for a terminal in a non-connected state; and transmitting the target configuration information to the terminal for instructing the terminal to receive the one or more TRSs/CSI-RSs based on the target configuration information when the terminal is in the non-connected state. According to the present disclosure, the base station may flexibly select TRS/CSI-RS configuration, and by configuring one or more TRSs/CSI-RSs applicable to a current communication environment, efficiency of signal transmission may be subsequently improved and power consumption may be reduced.

18 Claims, 8 Drawing Sheets

S101

Determine target configuration information from a plurality of pieces of preset TRS/CSI-RS configuration information

S102

Transmit the target configuration information to the terminal

(56) References Cited

U.S. PATENT DOCUMENTS

| | | | |
|---|---|---|---|
| 2021/0227496 A1* | 7/2021 | Ly | H04W 76/27 |
| 2021/0288773 A1* | 9/2021 | Lin | H04W 56/001 |
| 2022/0078735 A1* | 3/2022 | Saggar | H04L 27/261 |
| 2022/0124674 A1* | 4/2022 | Babaei | H04W 68/02 |
| 2023/0078444 A1* | 3/2023 | Maleki | H04W 52/0229 |
| | | | 370/311 |

FOREIGN PATENT DOCUMENTS

| | | | |
|---|---|---|---|
| CN | 110637418 A | 12/2019 | |
| CN | 110690947 A | 1/2020 | |
| CN | 110839290 A | 2/2020 | |
| CN | 111133686 A | 5/2020 | |
| WO | 2019/024055 A1 | 2/2019 | |
| WO | 2019/028849 A1 | 2/2019 | |

OTHER PUBLICATIONS

State Intellectual Property Office of the People's Republic of China, Office Action and Search Report Issued in Application No. 2020800027559, Jun. 19, 2023, 16 pages.

Jia Hou et al, "Research on DSS uplink physical layer configuration", Electronic Technology Applications, issue 09, Sep. 6, 2020, 7 pages.

ISA State Intellectual Property Office of the People's Republic of China, Written Opinion of the International Searching Authority Issued in Application No. PCT/CN2020/121670, Jul. 14, 2021, WIPO, 7 pages.

State Intellectual Property Office of the People's Republic of China, Office Action and Search Report Issued in Application No. 2020800027559, Sep. 28, 2022, 20 pages.(Submitted with Machine/Partial Translation).

ISA State Intellectual Property Office of the People's Republic of China, International Search Report Issued in Application No. PCT/CN2020/121670, Jul. 14, 2021, WIPO, 4 pages.

Sony. "On TRS/CSI-RS occasion(s) for idle/inactive Ues" "3GPP TSG RAN WG1 #102e R1-2005583 e-Meeting, Aug. 17-Aug. 28, 2020"Aug. 7, 2020,3 pages.

Vivo "Discussion on TRS/CSI-RS occasion(s) for idle/inactive Ues" "3GPP TSG RAN WG1 #102-e R1-2005389 e-Meeting, Aug. 17-28, 2020" Aug. 8, 2020, 7 pages.

Ericsson"Provisioning of potential TRS/CSI-RS occasion(s) for Idle/Inactive Ues" "3GPP TSG RAN WG1 #102-e Tdoc R1-2006666 e-Meeting, Aug. 17-Aug. 28, 2020" Aug. 8, 2020, 3 pages.

* cited by examiner

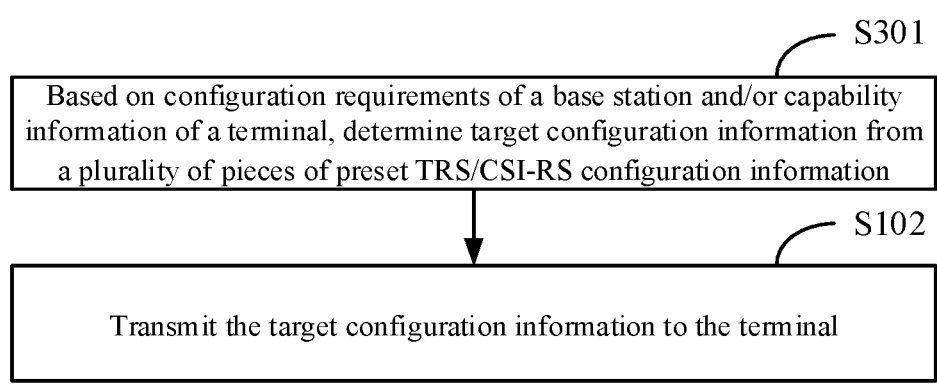

S301

Based on configuration requirements of a base station and/or capability information of a terminal, determine target configuration information from a plurality of pieces of preset TRS/CSI-RS configuration information

S102

Transmit the target configuration information to the terminal

FIG. 3

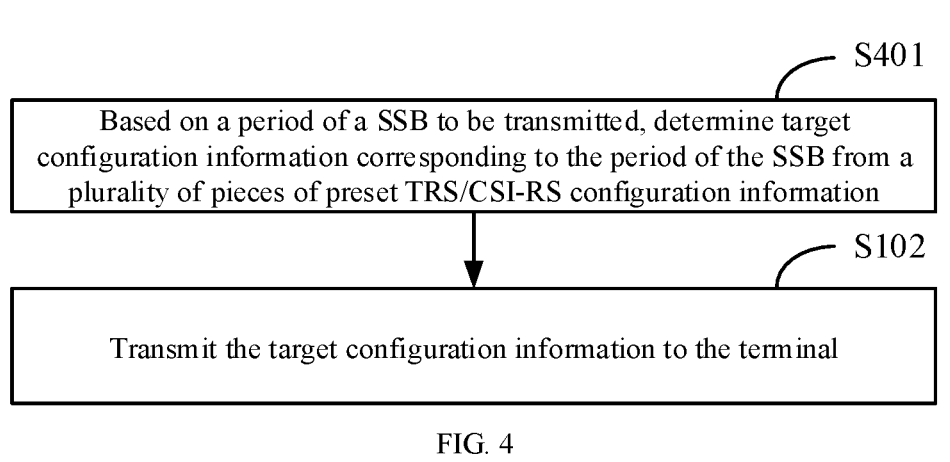

S401

Based on a period of a SSB to be transmitted, determine target configuration information corresponding to the period of the SSB from a plurality of pieces of preset TRS/CSI-RS configuration information

S102

Transmit the target configuration information to the terminal

FIG. 4

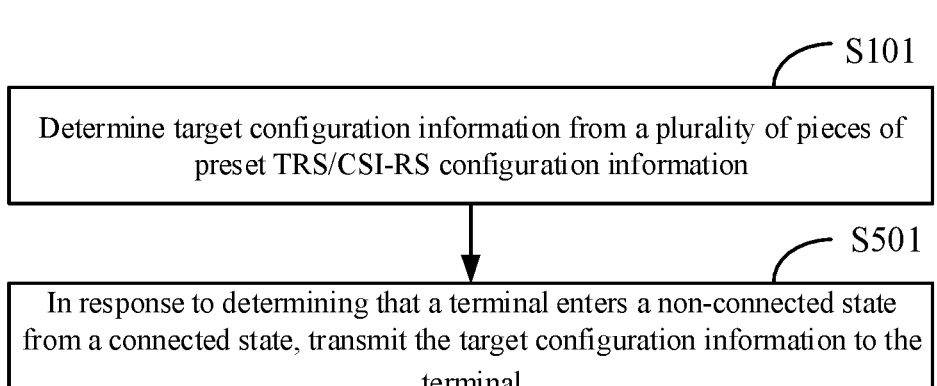

S101

Determine target configuration information from a plurality of pieces of preset TRS/CSI-RS configuration information

S501

In response to determining that a terminal enters a non-connected state from a connected state, transmit the target configuration information to the terminal

FIG. 5

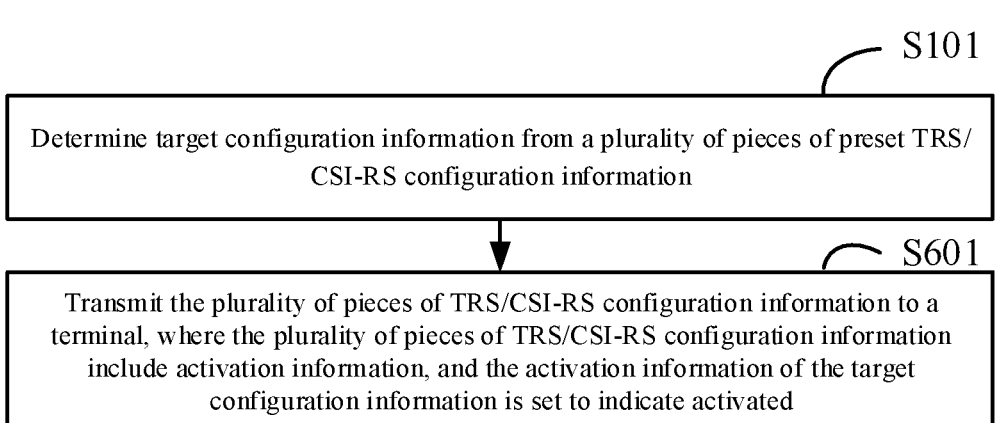
FIG. 6
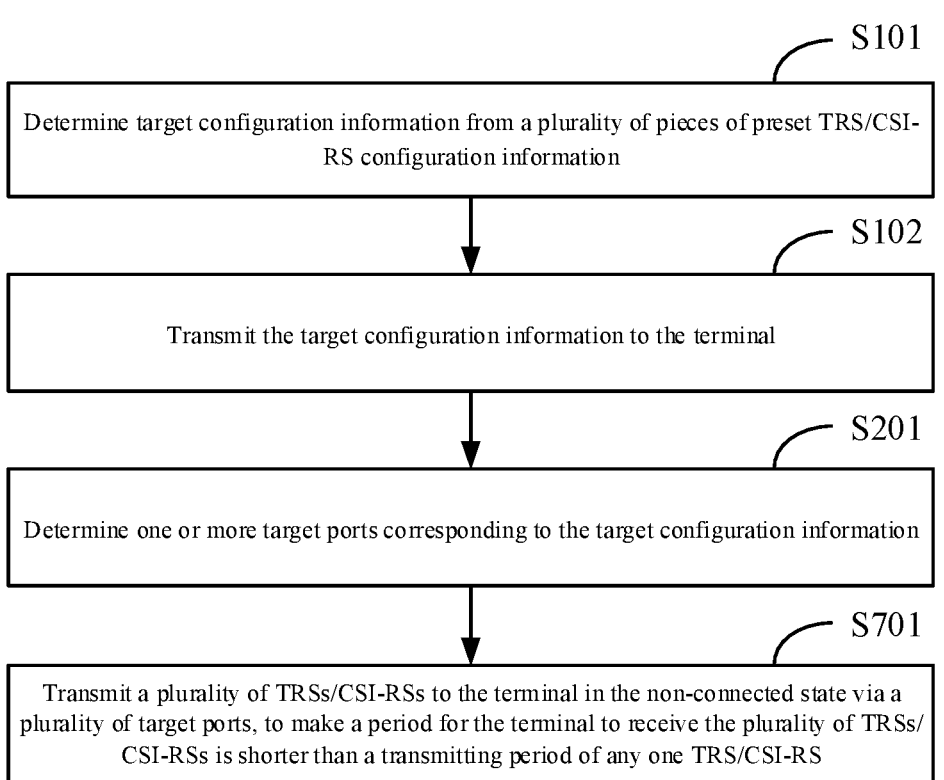
FIG. 7
S801
Receive target configuration information transmitted by a base station, the target configuration information is for instructing that one or more TRSs/CSI-RSs are configured when a terminal is in a non-connected state
FIG. 8

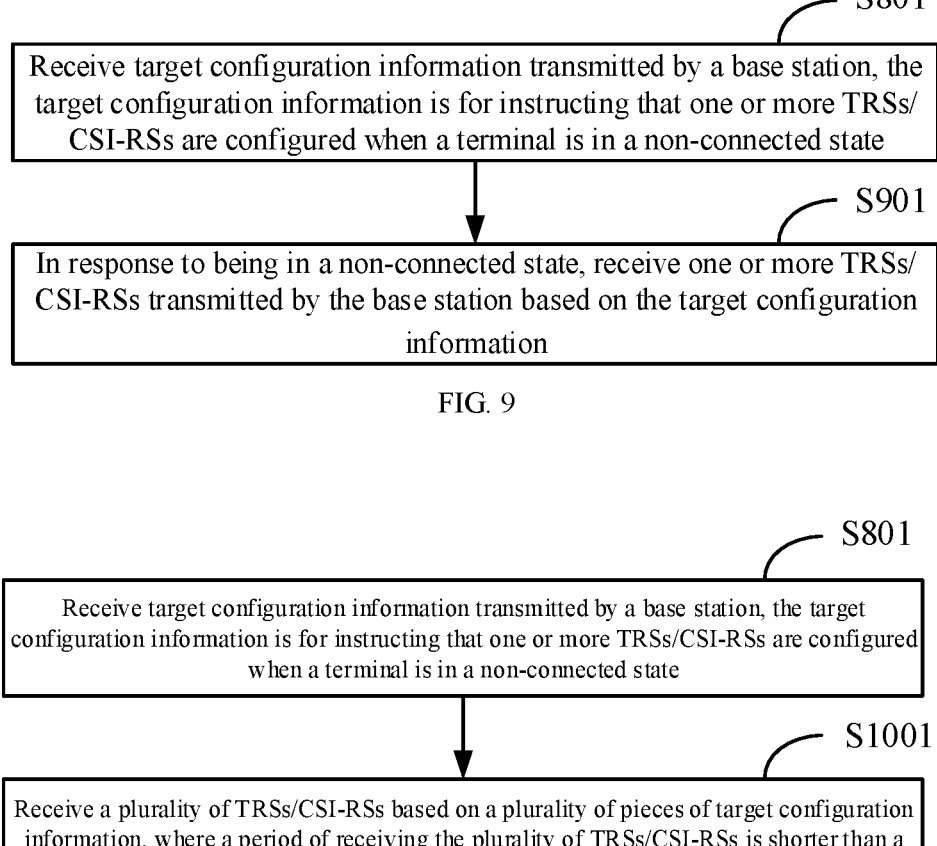

S801

Receive target configuration information transmitted by a base station, the target configuration information is for instructing that one or more TRSs/ CSI-RSs are configured when a terminal is in a non-connected state

S901

In response to being in a non-connected state, receive one or more TRSs/ CSI-RSs transmitted by the base station based on the target configuration information

Receive target configuration information transmitted by a base station, the target configuration information is for instructing that one or more TRSs/CSI-RSs are configured when a terminal is in a non-connected state

S1001

Receive a plurality of TRSs/CSI-RSs based on a plurality of pieces of target configuration information, where a period of receiving the plurality of TRSs/CSI-RSs is shorter than a transmitting period of any one TRS/CSI-RS

FIG. 10

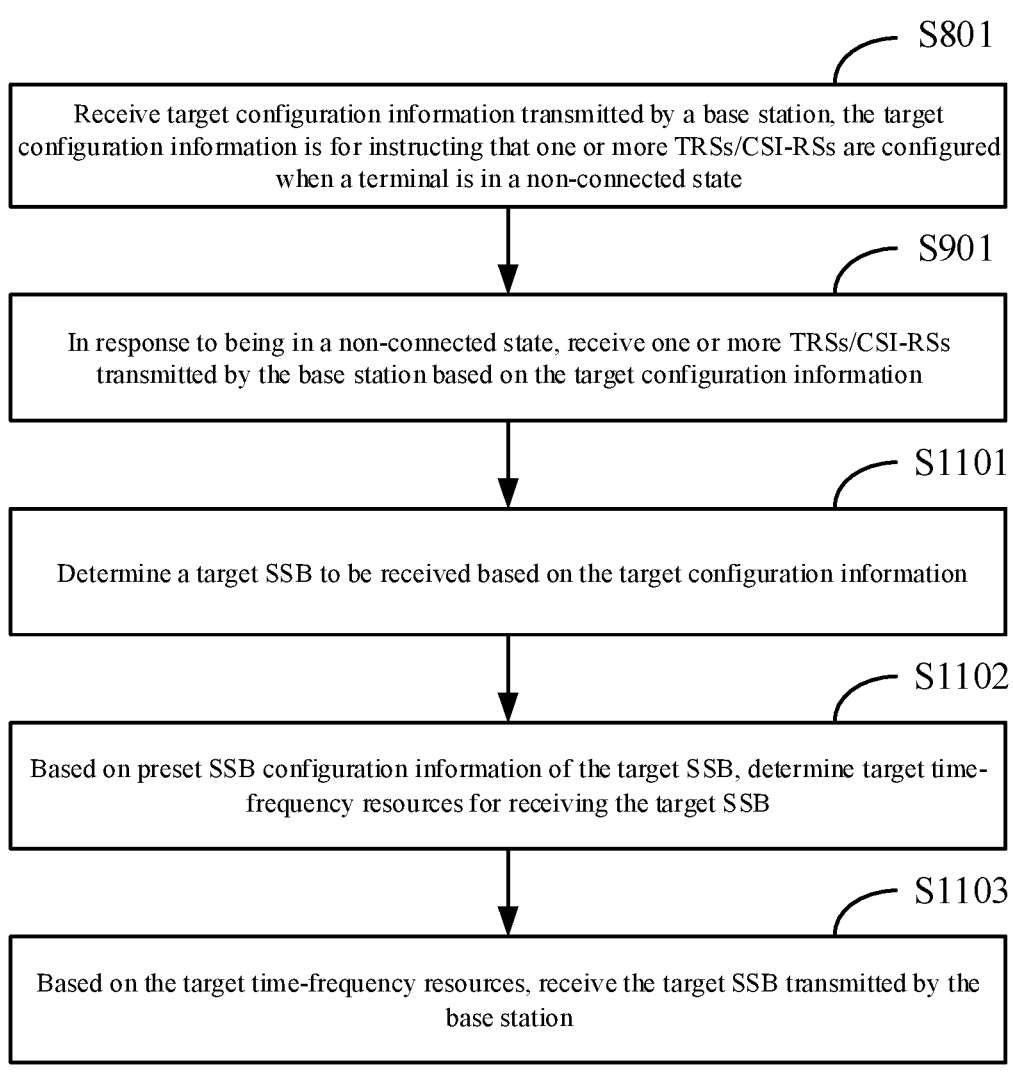

S801

Receive target configuration information transmitted by a base station, the target configuration information is for instructing that one or more TRSs/CSI-RSs are configured when a terminal is in a non-connected state

S901

In response to being in a non-connected state, receive one or more TRSs/CSI-RSs transmitted by the base station based on the target configuration information

S1101

Determine a target SSB to be received based on the target configuration information

S1102

Based on preset SSB configuration information of the target SSB, determine target time-frequency resources for receiving the target SSB

S1103

Based on the target time-frequency resources, receive the target SSB transmitted by the base station

FIG. 11

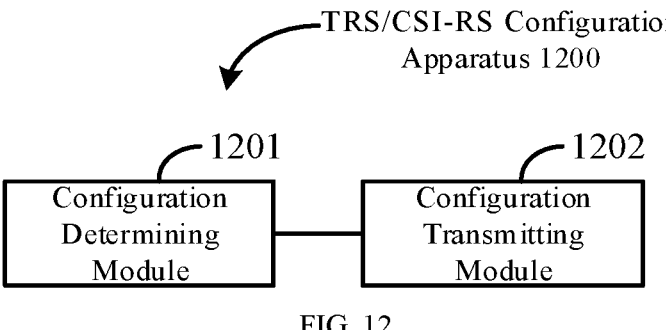

TRS/CSI-RS Configuration Apparatus 1200

1201

Configuration Determining Module

1202

Configuration Transmitting Module

FIG. 12

TRS/CSI-RS Configuration Apparatus 1300

TRS/CSI-RS Configuration
Apparatus 1400

TRS/CSI-RS Configuration
Apparatus 1500

TRS/CSI-RS Configuration Apparatus 1600

1700

1722

Processing
Component

Wireless
Transmitting/
Receiving
Component

1724

Antenna
Component

1726

TRS/CSI-RS CONFIGURATION METHOD AND APPARATUS

CROSS-REFERENCE TO RELATED APPLICATION

The present application is a U.S. National Stage of International Application No. PCT/CN2020/121670, filed on Oct. 16, 2020, the entire content of which is incorporated herein by reference for all purposes.

TECHNICAL FIELD

The present disclosure relates to communication technologies, and in particular to TRS/CSI-RS configuration methods and apparatuses, electronic devices and computer readable storage media.

BACKGROUND

A kind of special CSI-RS (Channel State Information Reference Signal) is introduced into 5G NR (New Radio), which may also be called TRS (Tracking Reference Signal). Based on this TRS/CSI-RS, a terminal may perform time and frequency synchronization.

A terminal in a non-connected state may also wake up to receive the TRS/CSI-RS as expected, and perform the time-frequency synchronization based on the TRS/CSI-RS. In this way, with assistance of the TRS/CSI-RS, the terminal may reduce a number of received SSBs when performing time-frequency synchronization, thus shortening the wake-up time and reducing power consumption.

On this basis, how to flexibly configure the TRS/CSI-RS to further reduce power consumption becomes a problem to be solved.

SUMMARY

In view of this, embodiments of the present disclosure provide TRS/CSI-RS configuration methods and apparatus to solve technical problems in related technologies.

According to a first aspect of the embodiments of the present disclosure, a TRS/CSI-RS configuration method is provided, which is performed by a base station, and the method includes: determining target configuration information from a plurality of pieces of preset TRS/CSI-RS configuration information, where the target configuration information is for configuring one or more TRSs/CSI-RSs for a terminal in a non-connected state; and transmitting the target configuration information to the terminal for instructing the terminal to receive the one or more TRSs/CSI-RSs based on the target configuration information when the terminal is in the non-connected state.

According to a second aspect of the embodiments of the present disclosure, a TRS/CSI-RS configuration method is provided, which is performed by a terminal, and the method includes: receiving target configuration information transmitted by a base station, where the target configuration information is for instructing that one or more TRSs/CSI-RSs are configured when the terminal is in a non-connected state.

According to a third aspect of embodiments of the present disclosure, an electronic device includes: a processor, and a memory storing instructions executable by the processor; where the processor is configured to implement any of the above TRS/CSI-RS configuration methods.

According to a fourth aspect of the embodiments of the present disclosure, a computer-readable storage medium is provided, on which a computer program is stored, and when the program is executed by a processor, steps in any of the above TRS/CSI-RS configuration method are implemented.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without inventive efforts.

FIG. 3 is a schematic flowchart illustrating another TRS/CSI-RS configuration method according to an embodiment of the present disclosure.

FIG. 4 is a schematic flowchart illustrating another TRS/CSI-RS configuration method according to an embodiment of the present disclosure.

FIG. 5 is a schematic flowchart illustrating another TRS/CSI-RS configuration method according to an embodiment of the present disclosure.

FIG. 6 is a schematic flowchart illustrating another TRS/CSI-RS configuration method according to an embodiment of the present disclosure.

FIG. 7 is a schematic flowchart illustrating another TRS/CSI-RS configuration method according to an embodiment of the present disclosure.

FIG. 8 is a schematic flowchart illustrating another TRS/CSI-RS configuration method according to an embodiment of the present disclosure.

FIG. 9 is a schematic flowchart illustrating another TRS/CSI-RS configuration method according to an embodiment of the present disclosure.

FIG. 10 is a schematic flowchart illustrating another TRS/CSI-RS configuration method according to an embodiment of the present disclosure.

FIG. 11 is a schematic flowchart illustrating another TRS/CSI-RS configuration method according to an embodiment of the present disclosure.

FIG. 12 is a schematic block diagram illustrating a TRS/CSI-RS configuration apparatus according to an embodiment of the present disclosure.

DETAILED DESCRIPTION OF THE EMBODIMENTS

The following clearly and completely describes the technical solutions in the embodiments of the present disclosure with reference to the accompanying drawings in the embodiments of the present disclosure. The described embodiments are merely some examples of the present disclosure rather than all of the embodiments. All other embodiments obtained by a person of ordinary skill in the art based on the embodiments of the present disclosure without creative efforts shall fall within the protection scope of the present disclosure.

According to the embodiments of the present disclosure, a base station may flexibly select TRS/CSI-RS configuration, and by configuring a TRS/CSI-RS applicable to a current communication environment, efficiency of signal transmission may be subsequently improved and power consumption may be reduced.

Figure 1:
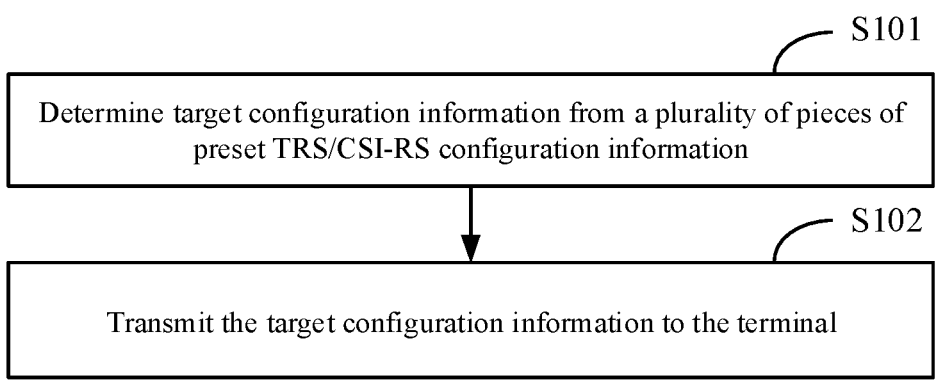
FIG. 1 is a schematic flowchart illustrating a TRS/CSI-RS configuration method according to an embodiment of the present disclosure.

FIG. 1 is a schematic flowchart illustrating a TRS/CSI-RS configuration method according to an embodiment of the present disclosure. The TRS/CSI-RS configuration method shown in this embodiment may be performed by a base station, and the base station may include but is not limited to a 4G base station, a 5G base station, a 6G base station, and so on. The base station may communicate with terminals serving as user equipment, and the terminals may include but are not limited to mobile phones, tablet computers, wearable devices, sensors, Internet of Things devices and other electronic devices. In an embodiment, the terminal may be a terminal by which the TRS/CSI-RS configuration method described in any subsequent embodiment is performed.

As shown in FIG. 1, the TRS/CSI-RS configuration method may include steps S101 and S102.

At step S101, target configuration information is determined from a plurality of pieces of preset TRS/CSI-RS configuration information, where the target configuration information is for configuring one or more TRSs/CSI-RSs for a terminal in a non-connected state.

In related technologies, in order to reduce power consumption, the terminal in the non-connected state may periodically enter a sleep mode, and then wake up at a designated PO (Paging Occasion) position to receive paging. In general, the terminal has to perform time and frequency synchronization before receiving paging. For example, the terminal may wake up before a SSB (Synchronization Signal Block) closest to the designated PO position, and perform time-frequency synchronization via a synchronization signal of the SSB.

For terminals in some special situations, such as a terminal in an environment with poor signal quality, a low power consumption terminal such as RedCap UE (Reduced capabilities User Equipment) or the like, the terminal has to receive a plurality of SSBs to achieve accurate time-frequency synchronization. In this way, the terminal has to wake up before the plurality of SSBs, which increases power consumption of the terminal.

In order to reduce the power consumption of the terminal, the base station may also transmit the TRS/CSI-RS to the terminal in the non-connected state, so as to make the terminal performing time-frequency synchronization based on both the one or more TRSs/CSI-RSs and one or more SSBs at the same time. With assistance of the one or more TRSs/CSI-RSs, the terminal may reduce a number of received SSB signals, thus shortening wake-up time, which is contributing to power saving.

However, at present, the base station only configures single TRS/CSI-RS configuration information for the non-connected state terminal in a cell, which makes it impossible for the base station to adjust a method of transmitting TRS/CSI-RS configuration to the non-connected state terminal according to changes in the communication environment. For example, the base station is unable to adjust one or more ports for transmitting one or more TRSs/CSI-RSs according to usage of its own wireless resources, and so on.

In an embodiment of the disclosure, a plurality of pieces of TRS/CSI-RS configuration information are preset in the base station, and the plurality of pieces of TRS/CSI-RS configuration information are configured for a terminal in a connected state (a connected terminal).

It should be noted that: for the connected terminal, the base station is configured with the plurality of pieces of TRS/CSI-RS configuration information. Based on the plurality of pieces of TRS/CSI-RS configuration information, the base station may transmit TRSs/CSI-RSs to different terminals. For example, for each terminal, the base station may use TRS/CSI-RS configuration information uniquely corresponding to the terminal to transmit one or more TRSs/CSI-RSs to the terminal. Or, for a group of terminals, the base station may use same TRS/CSI-RS configuration information to transmit one or more TRSs/CSI-RSs to a plurality of terminals in the group.

In an embodiment, the TRS/CSI-RS configuration information may include at least one of: a port number corresponding to the configuration information, a time domain resource of TRS/CSI-RS, a frequency domain resource of TRS/CSI-RS, or a period of TRS/CSI-RS. Optionally, a pattern (e.g., fixed pattern positions in the time-frequency domain) may be used to indicate the time domain resource of TRS/CSI-RS, and the frequency domain resource of TRS/CSI-RS.

In an embodiment, the base station may determine several pieces of target configuration information from the plurality of pieces of preset TRS/CSI-RS configuration information for configuring one or more TRSs/CSI-RSs for the terminal in the non-connected state.

Returning to the flow chart of FIG. 1, at step S102, the target configuration information is transmitted to the terminal, which is for instructing the terminal to receive the one or more TRSs/CSI-RSs based on the target configuration information when the terminal is in the non-connected state.

In an embodiment, after determining the target configuration information, the base station may further transmit the target configuration information to the terminal. The terminal may receive the target configuration information. According to the target configuration information, the terminal may obtain at least one of a port number, a time domain resource, a frequency domain resource, a period for the base station to transmit the one or more TRSs/CSI-RSs or the like. Furthermore, when the terminal is in the non-connected state, it may wake up to receive the one or more TRSs/CSI-RSs according to its own requirements. For example, the terminal may wake up before the PO position to receive the one or more TRSs/CSI-RSs.

It can be understood that compared to related technologies where a base station configures single TRS/CSI-RS configuration information for a non-connected state terminal, in the embodiment shown in FIG. 1, the base station may select from the plurality of pieces of TRS/CSI-RS configuration information, and perform configuration flexibly according to an actual communication environment. By the embodiment shown in FIG. 1, flexibility of configuring TRS/CSI-RS configuration information by the base station is significantly improved. In this way, efficiency of information transmission between the base station and the terminal may be improved, and power consumption of the terminal and the base station may be reduced.

Figure 2:
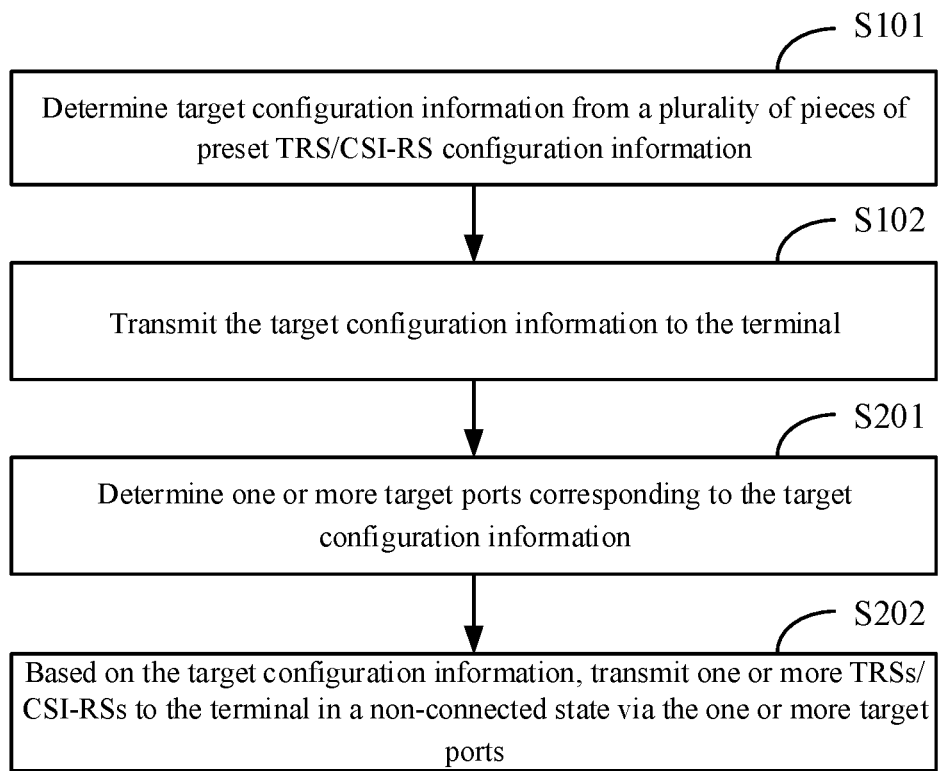
FIG. 2 is a schematic flowchart illustrating another TRS/CSI-RS configuration method according to an embodiment of the present disclosure.

FIG. 2 is a schematic flowchart illustrating another TRS/CSI-RS configuration method according to an embodiment of the present disclosure.

As shown in FIG. 2, the method includes steps S101 and S102 and further includes steps S201 and S202.

At step S201, one or more target ports corresponding to the target configuration information are determined.

In an embodiment, the plurality of pieces of TRS/CSI-RS configuration information configured by the base station correspond to ports, respectively. For example, TRS/CSI-RS configuration information 1 corresponds to port 1, and TRS/CSI-RS configuration information 2 corresponds to port 2. The port may be a logical antenna port of the base station, and the base station sends information via the logical antenna port.

In an embodiment, the base station may determine the one or more target ports corresponding to the target configuration information. Optionally, the target configuration information may include a port number, and the base station may determine a target port indicated by the port number. Or, the base station may maintain a mapping relationship between TRS/CSI-RS configuration information and port numbers, and then the base station may determine one or more target ports corresponding to one or more pieces of the target configuration information according to the mapping relationship.

At step S202, based on the target configuration information, one or more TRSs/CSI-RSs are transmitted to the terminal in a non-connected state via the one or more target ports.

In an embodiment, the base station may transmit the one or more TRSs/CSI-RSs according to the target configuration information. The target configuration information may include at least one of a time domain resource of TRS/CSI-RS, a frequency domain resource of TRS/CSI-RS, or a period of TRS/CSI-RS. Optionally, for content not included in the configuration information, the base station may use preset default configuration for configuration. For example, if the configuration information does not include a frequency domain resource of TRS/CSI-RS, the base station may transmit the one or more TRSs/CSI-RSs according to a preset default frequency domain resource.

In an embodiment, the base station may determine a moment to transmit a TRS/CSI-RS based on the configured time domain resource of the TRS/CSI-RS and determine a frequency band to transmit the TRS/CSI-RS based on the frequency domain resource indicated by the TRS/CSI-RS configuration information. At such determined moment and frequency band, the base station may periodically transmit the TRS/CSI-RS to the terminal via a target port.

In an embodiment, the base station may configure the one or more TRSs/CSI-RSs according to the target configuration information. Subsequently, based on the target configuration information, the terminal may wake up to receive the one or more TRSs/CSI-RSs transmitted by the base station according to its own requirements. In some examples, for each period, based on the time domain resource and frequency domain resource indicated by the target configuration information, the terminal may wake up to receive the one or more TRSs/CSI-RSs according to its practical requirements, for example, before a PO position.

According to the embodiment shown in FIG. 2, the base station may transmit the one or more TRSs/CSI-RSs to the terminal in the non-connected state, so as to make the terminal to perform time-frequency synchronization according to the one or more TRSs/CSI-RSs. With assistance of the one or more TRSs/CSI-RSs, the terminal may reduce a number of received SSBs, thus shortening wake-up time and effectively reducing power consumption. Furthermore, the base station transmits the one or more TRSs/CSI-RSs based on the determined target configuration information, that is, the base station may select better configuration for the transmitting. Compared with transmitting based on fixed configuration, the method in this embodiment may improve efficiency of information transmission, thus reducing power consumption of the base station and the terminal.

Based on a plurality of pieces of TRS/CSI-RS configuration information, a base station may flexibly select target configuration information. There are various selection methods, two specific embodiments are described below with reference to FIGS. 3 and 4. It should be noted that the descriptions here are only illustrative but not specifically limited.

FIG. 3 is a schematic flowchart illustrating another TRS/CSI-RS configuration method according to an embodiment of the present disclosure. As shown in FIG. 3, determining target configuration information from a plurality of pieces of preset TRS/CSI-RS configuration information may include step S301 in addition to previously described S102.

At step S301, based on configuration requirements of a base station and/or capability information of a terminal, target configuration information is determined from a plurality of pieces of preset TRS/CSI-RS configuration information.

In an embodiment, the base station may determine the target TRS/CSI-RS configuration information according to its own configuration requirements and/or the capability information of the terminal.

The configuration requirements of the base station may include information in various aspects, for example, a power saving mode configured for the base station. The base station may select appropriate TRS/CSI-RS configuration information according to the configuration requirements and current usage conditions, such as power consumption and resource usage rate. For example, if the current power consumption of the base station is relatively low and the resource usage rate is relatively low, the base station may select TRS/CSI-RS configuration information with a relatively short period transmitting the TRS/CSI-RS.

The capability of the terminal may also include various aspects, such as power consumption of the terminal. It should be noted that the base station may transmit TRSs/CSI-RSs for non-connected state terminals in a cell on a shared basis. Therefore, it is necessary to comprehensively consider common conditions of a plurality of terminals in the cell to select appropriate TRS/CSI-RS configuration information. For example, if a large number of terminals in the cell are at cell edges, quality of signal receiving is poor, the base station may select the TRS/CSI-RS configuration information with a relatively short TRS/CSI-RS transmission period to ensure receiving efficiency of the terminal.

According to the embodiment shown in FIG. 3, the base station may determine the target TRS/CSI-RS configuration information by comprehensively considering various factors such as its own configuration requirements, capability information of the terminal and the like. If the selection is made according to power consumption, the power consumption of the terminal and/or the base station may be reduced. If the selection is made according to receiving, performance pressure of the base station may be reduced, and so on. The base station implements a flexible and variable configuration strategy, which overall improves transmission efficiency of the TRS/CSI-RS.

FIG. 4 is a schematic flowchart illustrating another TRS/CSI-RS configuration method according to an embodiment of the present disclosure. As shown in FIG. 4, determining target configuration information from a plurality of pieces of preset TRS/CSI-RS configuration information may include step S401 in addition to previously described S102.

At step S401, based on a period of a SSB to be transmitted, target configuration information corresponding to the period of the SSB is determined from a plurality of pieces of preset TRS/CSI-RS configuration information.

In an embodiment, in order to reduce power consumption, a terminal may use one or more TRSs/CSI-RSs in combination with an SSB to perform time-frequency synchronization. In order to further shorten wake-up time of the terminal, a base station may use TRS/CSI-RS configuration information corresponding to the period of the SSB as the target configuration information.

In an embodiment, the base station may select TRS/CSI-RS configuration information including a period that is identical to the period of the SSB. For example, if the period of the SSB is 80 ms, the base station may select TRS/CSI-RS configuration information whose TRS/CSI-RS transmission period is also 80 ms as the target configuration information. If the period of the SSB is greater than 80 ms, such as 160 ms, the base station may select TRS/CSI-RS configuration information with a TRS/CSI-RS period greater than 80 ms as the target configuration information. If the period of the SSB is less than 10 ms, for example, 5 ms, the base station may select TRS/CSI-RS configuration information including a period less than 10 ms as the target configuration information.

It can be understood that the base station may use an identical period to transmit a SSB and a TRS/CSI-RS, so that the terminal may perform time-frequency synchronization via at least these kinds of signals in one period, which may shorten the wake-up time of the terminal and reduce the power consumption of the terminal compared to receiving a plurality of SSBs in a plurality of periods.

FIG. 5 is a schematic flowchart illustrating another TRS/CSI-RS configuration method according to an embodiment of the present disclosure. As shown in FIG. 5, transmitting the target configuration information to a terminal may include step S501 in addition to previously described S101.

At step S501, in response to determining that a terminal enters a non-connected state from a connected state, the target configuration information is transmitted to the terminal.

In an embodiment, a base station may transmit the target configuration information to the terminal before the terminal enters the non-connected state. For example, the base station may carry the target configuration information in an RRC message exchanged with the terminal.

In an embodiment, in response to determining that the terminal enters the non-connected state from the connected state, the target configuration information may be transmitted to the terminal. For example, the base station may carry the target configuration information in an RRC Release message or an RRC Suspend Release message; or the base station may transmit the target configuration information via other messages while transmitting a Release message.

FIG. 6 is a schematic flowchart illustrating another TRS/CSI-RS configuration method according to an embodiment of the present disclosure. As shown in FIG. 6, transmitting the target configuration information to a terminal may include step S601 in addition to previously described S101.

At step S601, the plurality of pieces of TRS/CSI-RS configuration information are transmitted to a terminal, where the plurality of pieces of TRS/CSI-RS configuration information include activation information, and the activation information of the target configuration information is set to indicate activated.

In an embodiment, the base station may only transmit target TRS/CSI-RS configuration information to the terminal with indicating that this TRS/CSI-RS configuration information is in a default activated state. In this way, the terminal may take the received TRS/CSI-RS configuration information as target configuration information.

In an embodiment, the base station may transmit a plurality of pieces of TRS/CSI-RS configuration information to the terminal, where the plurality of pieces of TRS/CSI-RS configuration information may include activated TRS/CSI-RS configuration information and inactive TRS/CSI-RS configuration information. The base station may carry activation information in the TRS/CSI-RS configuration information, which is for indicating that the TRS/CSI-RS configuration information is in an activated state or not.

In an embodiment, the activation information may be a flag bit in the TRS/CSI-RS configuration information. For example, a value of 0 for the flag bit may indicate an inactive state, and a value of 1 for the flag bit may indicate the activated state.

In an embodiment, the activation information may also be other information corresponding to the TRS/CSI-RS configuration information. For example, the activation information may include an identifier of the configuration information and an activation state of the configuration information; or the activation information may include an identifier of the configuration information in the activated state.

In an embodiment, the terminal may receive the activation information, and look for the TRS/CSI-RS configuration information that is set to be activated, then this TRS/CSI-RS configuration information may be determined to be the target configuration information.

FIG. 7 is a schematic flowchart illustrating another TRS/CSI-RS configuration method according to an embodiment of the present disclosure. As shown in FIG. 7, the number of target ports may be a plurality.

Transmitting one or more TRSs/CSI-RSs to a terminal in a non-connected state via one or more target ports may include step S701 in addition to previously described steps S101, S102, and S201.

At step S701, a plurality of TRSs/CSI-RSs are transmitted to the terminal in the non-connected state via a plurality of target ports, to make a period for the terminal to receive the plurality of TRSs/CSI-RSs is shorter than a transmitting period of any one TRS/CSI-RS.

In an embodiment, the number of target configuration information may be a plurality, and the number of the target ports corresponding to the target configuration information may also be a plurality.

In an embodiment, the base station may transmit the plurality of TRSs/CSI-RSs via the plurality of target ports. The terminal may determine to receive the plurality of TRSs/CSI-RSs according to its own requirements, for example, receiving one or more of the plurality of TRSs/CSI-RS s.

In an embodiment, in order to make the terminal to better receive the one or more TRSs/CSI-RSs, when configuring the one or more TRSs/CSI-RSs, the base station may configure the plurality of TRSs/CSI-RSs to be transmitted at different moments.

For example, if the base station transmits TRSs/CSI-RSs through 2 ports and the TRSs/CSI-RSs both have a period of the transmission as one radio frame, one TRS/CSI-RS may be transmitted half a radio frame before another TRS/CSI-RS, which is equivalent to the terminal may receive one TRS/CSI-RS per half a radio frame. If the base station transmits TRSs/CSI-RSs through 3 ports and the period of the transmission is one radio frame, the 3 TRSs/CSI-RSs may be transmitted at an interval of ⅓ radio frames, which is equivalent to the terminal may receive the TRSs/CSI-RSs at a period of ⅓ radio frames.

According to the embodiment shown in FIG. 7, if the terminal receives the plurality of TRSs/CSI-RSs, its receiving efficiency is obviously higher than that of only receiving one TRS/CSI-RS. In this way, the base station does not change the period of transmitting signals, but actually shortens the period for the terminal to receive the one or more TRSs/CSI-RSs by means of multi-port transmission. On one hand, the base station does not increase its own performance pressure; on the other hand, when the terminal has to receive the one or more TRSs/CSI-RSs, wake-up time may be further shortened and power consumption may be reduced.

FIG. 8 is a schematic flowchart illustrating a TRS/CSI-RS configuration method according to an embodiment of the present disclosure. The TRS/CSI-RS configuration method shown in this embodiment may be performed by terminals, and the terminals may include but are not limited to electronic devices such as mobile phones, tablet computers, wearable devices, sensors, and Internet of Things devices. The terminals may serve as user equipment to communicate with a base station, and the base station includes but is not limited to a 4G base station, a 5G base station, and a 6G base station. In an embodiment, the base station may be a base station by which the TRS/CSI-RS configuration method described in any of the above embodiments is performed.

As shown in FIG. 8, the TRS/CSI-RS configuration method may include step S801.

At step S801, target configuration information transmitted by a base station is received, the target configuration information is for instructing that one or more TRSs/CSI-RSs are configured when a terminal is in a non-connected state.

In an embodiment, when the terminal is in the non-connected state, it may enter a sleep mode, and wake up to receive information when necessary. For example, the terminal may wake up at a PO position to receive paging, or the terminal may also wake up before the PO position, and receive a SSB signal and one or more TRSs/CSI-RSs to perform time-frequency synchronization.

In an embodiment, the base station may transmit the target configuration information to the terminal after determining the target configuration information from a plurality of pieces of preset TRS/CSI-RS configuration information.

In an embodiment, the TRS/CSI-RS configuration information may include at least one of: a port number corresponding to the configuration information, a time domain resource of TRS/CSI-RS, a frequency domain resource of TRS/CSI-RS, or a period of TRS/CSI-RS.

In an embodiment, the terminal may be configured to receive one or more TRSs/CSI-RSs when the terminal is in the non-connected state according to the above configuration information. The terminal may determine the time domain resource and the frequency domain resource for the base station to transmit the one or more TRSs/CSI-RSs according to the target configuration information. Optionally, for configuration not included in the configuration information, the terminal may use preset default configuration; or may obtain the configuration from the base station via other information.

FIG. 9 is a schematic flowchart illustrating another TRS/CSI-RS configuration method according to an embodiment of the present disclosure. As shown in FIG. 9, step S901 may be included in addition to previously described S801.

At step S901, in response to being in a non-connected state, one or more TRSs/CSI-RSs transmitted by the base station are received based on the target configuration information.

In an embodiment, the terminal may determine time-frequency resources for the base station to transmit the one or more TRSs/CSI-RSs, according to the target configuration information. In this way, the terminal may wake up before the base station transmits the one or more TRSs/CSI-RSs according to practical requirements, and receive the one or more TRSs/CSI-RSs in the frequency domain indicated by the target configuration information.

According to the embodiment shown in FIG. 9, the terminal may receive the one or more TRSs/CSI-RSs when it is necessary, for example, it may wake up before a PO position to perform time-frequency synchronization. With assistance of the one or more TRSs/CSI-RSs, the terminal may reduce a number of received SSB signals, thus shortening wake-up time and effectively reducing power consumption.

In an embodiment, receiving the target configuration information transmitted by the base station may include: in response to determining to enter the non-connected state from a connected state, receiving the target configuration information transmitted by the base station.

For example, the terminal may obtain the target configuration information from a received RRC Release message or a received RRC Suspend Release message.

In an embodiment, receiving the target configuration information transmitted by the base station may include: receiving a plurality of pieces of TRS/CSI-RS configuration information transmitted by the base station, where the plurality of pieces of TRS/CSI-RS configuration information may include activation information; and the TRS/CSI-RS configuration information with the activation information that is set to be activated may be determined as the target configuration information.

For example, the terminal may receive a plurality of pieces of TRS/CSI-RS configuration information including activated TRS/CSI-RS configuration information and inactive TRS/CSI-RS configuration information. The terminal may determine the target configuration information according to the activation information in the configuration information. For example, if the activation information is configured as activated, corresponding TRS/CSI-RS configuration information is the target configuration information.

FIG. 10 is a schematic flowchart illustrating another TRS/CSI-RS configuration method according to an embodiment of the present disclosure. As shown in FIG. 10, receiving the one or more TRSs/CSI-RSs transmitted by the base station based on the target configuration information may include step S1001 in addition to previously described S801.

At step S1001, a plurality of TRSs/CSI-RSs are received based on a plurality of pieces of target configuration information, where a period of receiving the plurality of TRSs/CSI-RSs is shorter than a transmitting period of any one TRS/CSI-RS.

In an embodiment, the number of the target configuration information may be a plurality, and the number of target ports corresponding to the target configuration information may also be a plurality.

In an embodiment, the base station may transmit the plurality of TRSs/CSI-RSs via the plurality of target ports. The terminal may determine to receive the plurality of TRSs/CSI-RSs according to its own requirements, for example, receiving one or more of the plurality of TRS s/CSI-RS s.

If the terminal receives the plurality of TRSs/CSI-RSs, its receiving efficiency is obviously higher than that of only receiving one TRS/CSI-RS. In this way, the base station does not change the period of transmitting signals, but actually shortens the period for the terminal to receive the TRSs/CSI-RSs by means of multi-port transmission. On one hand, the base station does not increase its own performance pressure; on the other hand, when the terminal has to receive the one or more TRSs/CSI-RSs, wake-up time may be further shortened and power consumption may be reduced.

FIG. 11 is a schematic flowchart illustrating another TRS/CSI-RS configuration method according to an embodiment of the present disclosure. As shown in FIG. 11, the method may further include steps S1101 to S1103 in addition to previously described S801 and S901.

At step S1101, a target SSB to be received is determined based on the target configuration information.

In an embodiment, in order to reduce power consumption, a terminal may use one or more TRSs/CSI-RSs to perform time-frequency synchronization, and receive SSB signals as little as possible to shorten wake-up time.

In an embodiment, the terminal may first determine the number of signals for time-frequency synchronization according to its own signal quality. For example, when the signal is poor, the terminal may have to receive 3 signals to perform the time-frequency synchronization. Optionally, the 3 signals may all be SSB signals, or may all be TRSs/CSI-RSs, or may be a sum of the SSB signals and the TRSs/CSI-RSs. Optionally, the SSB signal may include other information not included in the one or more TRSs/CSI-RSs, and the terminal has to receive at least one SSB signal.

In an embodiment, the terminal may determine the number of target SSB signals to be received according to the target TRS/CSI-RS configuration information. For example, the terminal may determine a transmission period of the target SSB signals, and determine the number of TRSs/CSI-RSs that can be received within one transmission period of the target SSB signals according to the target configuration information, and then the terminal may determine the number of the target SSB signals that have to be received.

For example, if a period for the base station transmitting the one or more TRSs/CSI-RSs is identical to the period for transmitting the target SSB signal, the terminal may determine that one TRS/CSI-RS may be received within one SSB signal period. The terminal may determine the target SSB(s) has/have to be received according to the number of signals for the time-frequency synchronization.

At step S1102, based on preset SSB configuration information of the target SSB, target time-frequency resources for receiving the target SSB are determined.

At step S1103, based on the target time-frequency resources, the target SSB transmitted by the base station is received.

In an embodiment, the terminal may determine the time-frequency resources for the target SSB signal has to be received according to the SSB configuration information received in advance. It should be noted that a method for determining the time-frequency resources here can refer to that in related arts, and will not be repeated here.

In an embodiment, the terminal may continuously receive a SSB signal and one or more TRSs/CSI-RSs after waking up. Compared with only receiving the SSB signal, wake-up time of the terminal may be shortened and power consumption may be reduced.

Corresponding to above embodiments of the TRS/CSI-RS configuration methods, the present disclosure further provides embodiments of TRS/CSI-RS configuration apparatuses.

FIG. 12 is a schematic block diagram illustrating a TRS/CSI-RS configuration apparatus 1200 according to an embodiment of the present disclosure. The TRS/CSI-RS configuration apparatus 1200 shown in this embodiment may be applicable to a base station, and the base station may include but is not limited to a 4G base station, a 5G base station, and a 6G base station. The base station may communicate with terminals serving as user equipment, and the terminals may include but are not limited to mobile phones, tablet computers, wearable devices, sensors, Internet of Things devices and other electronic devices. In an embodiment, the terminals may be terminals to which a TRS/CSI-RS configuration apparatus described in any subsequent embodiment is applicable.

As shown in FIG. 12, the TRS/CSI-RS configuration apparatus 1200 may include a configuration determining module 1201 and a configuration transmitting module 1202.

The configuration determining module 1201 is configured to determine target configuration information from a plurality of pieces of preset TRS/CSI-RS configuration information, where the target configuration information is for configuring one or more TRSs/CSI-RSs for a terminal in a non-connected state.

The configuration transmitting module 1202 is configured to transmit the target configuration information to the terminal for instructing the terminal to receive the one or more TRSs/CSI-RSs based on the target configuration information when the terminal is in the non-connected state.

Figure 13:
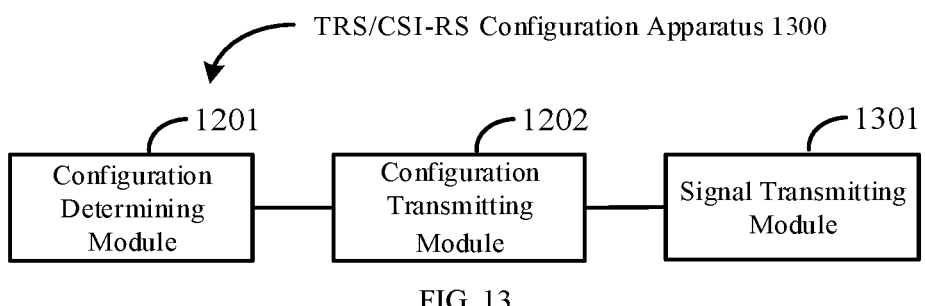
FIG. 13 is a schematic block diagram illustrating a TRS/CSI-RS configuration apparatus according to an embodiment of the present disclosure.

FIG. 13 is a schematic block diagram illustrating a TRS/CSI-RS configuration apparatus 1300 according to an embodiment of the present disclosure. As shown in FIG. 13, a plurality of pieces of TRS/CSI-RS configuration information may correspond to a plurality of ports, and the apparatus 1300 may include the configuration determining module 1201 and the configuration transmitting module 1202 and further include a signal transmitting module 1301.

The signal transmitting module 1301 is configured to: determine one or more target ports corresponding to the target configuration information; and based on the target configuration information, transmit the one or more TRSs/CSI-RSs to the terminal in the non-connected state via the one or more target ports.

Optionally, the configuration determining module 1201 may be specifically configured to determine the target configuration information from the plurality of pieces of TRS/CSI-RS configuration information based on configuration requirements of the base station and/or capability information of the terminal.

Optionally, the configuration determining module 1201 may be specifically configured to, according to a period of a SSB signal to be transmitted, determine target configuration information corresponding to the period of the SSB signal from the plurality of pieces of preset TRS/CSI-RS configuration information.

Optionally, the configuration transmitting module 1202 may be specifically configured to transmit the target configuration information to the terminal in response to determining that the terminal enters the non-connected state from a connected state.

Optionally, the configuration transmitting module 1202 may be specifically configured to transmit a plurality of pieces of TRS/CSI-RS configuration information to the terminal; where the plurality of pieces of TRS/CSI-RS configuration information include activation information, and the activation information of the target configuration information is set to be activated.

Optionally, the number of target ports in the signal transmitting module 1301 may be a plurality.

Transmitting the one or more TRSs/CSI-RSs to the terminal in the non-connected state via one or more target ports includes: transmitting a plurality of TRSs/CSI-RSs to the terminal in the non-connected state via a plurality of target ports, to make a period for the terminal to receive the plurality of TRSs/CSI-RSs is shorter than a transmission period of any one TRS/CSI-RS.

Optionally, moments for transmitting the plurality of TRSs/CSI-RSs are different.

Optionally, the TRS/CSI-RS configuration information may include at least one of: a port number corresponding to the configuration information, a time domain resource of TRS/CSI-RS, a frequency domain resource of TRS/CSI-RS, or a period of TRS/CSI-RS.

Corresponding to the above embodiments of the TRS/CSI-RS configuration methods, the present disclosure also provides another embodiment of a TRS/CSI-RS configuration apparatus. The TRS/CSI-RS configuration apparatus shown in this embodiment may be applied to terminals, and the terminals include but are not limited to mobile phones, tablet computers, wearable devices, sensors, Internet of Things devices and other electronic devices. The terminals may serve as user equipment to communicate with a base station, and the base station may include but is not limited to a 4G base station, a 5G base station, and a 6G base station. In an embodiment, the base station may be a base station to which the TRS/CSI-RS configuration apparatus described in any of the above embodiments is applicable.

Figure 14:
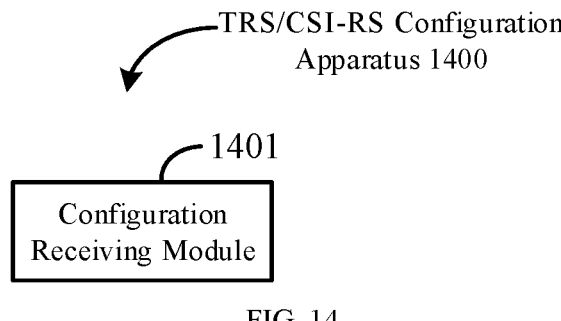
FIG. 14 is a schematic block diagram illustrating another TRS/CSI-RS configuration apparatus according to an embodiment of the present disclosure.

FIG. 14 is a schematic block diagram illustrating another TRS/CSI-RS configuration apparatus 1400 according to an embodiment of the present disclosure. As shown in FIG. 14, the apparatus 1400 may include a configuration receiving module 1401.

The configuration receiving module 1401 is configured to receive target configuration information transmitted by a base station, where the target configuration information is for instructing that one or more TRSs/CSI-RSs are configured when a terminal is in a non-connected state.

Figure 15:
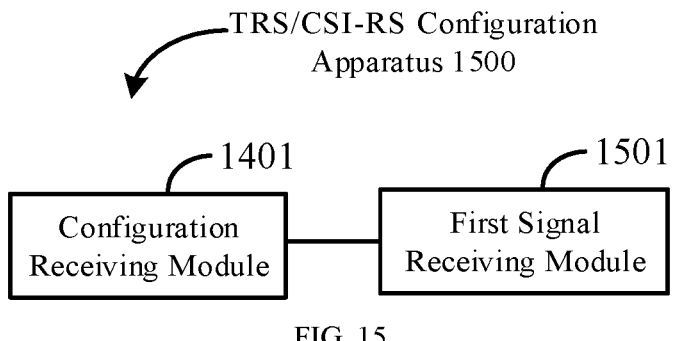
FIG. 15 is a schematic block diagram illustrating another TRS/CSI-RS configuration apparatus according to an embodiment of the present disclosure.

FIG. 15 is a schematic block diagram illustrating another TRS/CSI-RS configuration apparatus 1500 according to an embodiment of the present disclosure. As shown in FIG. 15, the apparatus 1500 may further include a first signal receiving module 1501 in addition to the configuration receiving module 1401.

The first signal receiving module 1501 is configured to receive one or more TRSs/CSI-RSs transmitted by a base station based on target configuration information in response to being in a non-connected state.

Optionally, the configuration receiving module 1401 may be specifically configured to: in response to determining to enter the non-connected state from a connected state, receive the target configuration information transmitted by the base station.

Optionally, the configuration receiving module 1401 may be specifically configured to: receive a plurality of pieces of TRS/CSI-RS configuration information transmitted by the base station, where the plurality of pieces of TRS/CSI-RS configuration information includes activation information; and in response to determining that the activation information of the TRS/CSI-RS configuration information is set to indicate activated, determine the TRS/CSI-RS configuration information as the target configuration information.

Optionally, in the first signal receiving module 1501, the number of the target configuration information may be a plurality; the first signal receiving module 1501 is specifically configured to receive a plurality of TRSs/CSI-RSs based on a plurality of pieces of target configuration information, where a period for receiving the plurality of TRSs/CSI-RSs is shorter than a transmission period of any one TRS/CSI-RS.

Figure 16:
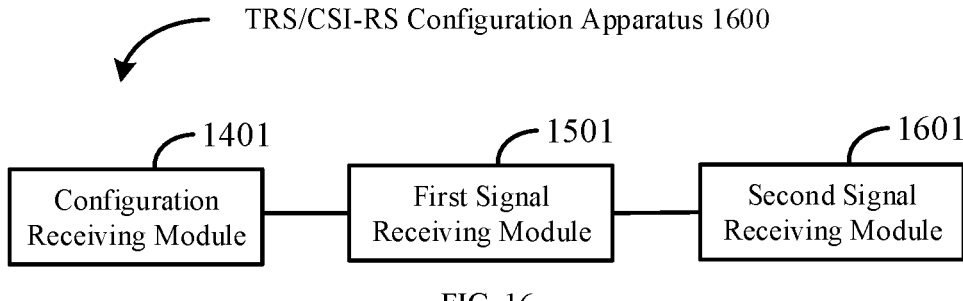
FIG. 16 is a schematic block diagram illustrating another TRS/CSI-RS configuration apparatus according to an embodiment of the present disclosure.

FIG. 16 is a schematic block diagram illustrating another TRS/CSI-RS configuration apparatus 1600 according to an embodiment of the present disclosure. As shown in FIG. 16, the apparatus 1600 may further include a second signal receiving module 1601 in addition to the configuration receiving module 1401 and the first signal receiving module 1501.

The second signal receiving module 1601 is configured to: determine a target SSB signal to be received based on the target configuration information; determine target time-frequency resources for receiving the target SSB signal based on preset SSB configuration information; and based on the target time-frequency resources, receive the target SSB signal transmitted by a base station.

Optionally, the TRS/CSI-RS configuration information may include at least one of: a port number corresponding to the configuration information, a time domain resource of TRS/CSI-RS, a frequency domain resource of TRS/CSI-RS, or a period of TRS/CSI-RS.

With regard to the apparatuses in the above embodiments, the specific manner in which the respective modules perform the operations has been described in detail in the embodiments of the related methods, and will not be explained in detail here.

For the embodiments of the apparatuses, since they basically correspond to the embodiments of the methods, they may be referred to the partial description of the embodiments of the methods. The apparatus embodiments described above are only schematic, and the modules described as separate components may or may not be physically separated, and the components displayed as modules may or may not be physical modules, that is, may be located in one place, or can be distributed to multiple network modules. Part or all of the modules may be selected according to actual requirements to implement the objectives of the solutions in the examples. Those of ordinary skill in the art can understand and implement the present disclosure without any creative effort.

An embodiment of the present disclosure further provides an electronic device, including: a processor, and a memory storing instructions executable by the processor; where the processor is configured to implement any of the above TRS/CSI-RS configuration methods.

An embodiment of the present disclosure also provides a computer readable storage medium having a computer program stored thereon, where the program is executed by a processor to implement steps in the TRS/CSI-RS configuration methods as described above.

Figure 17:
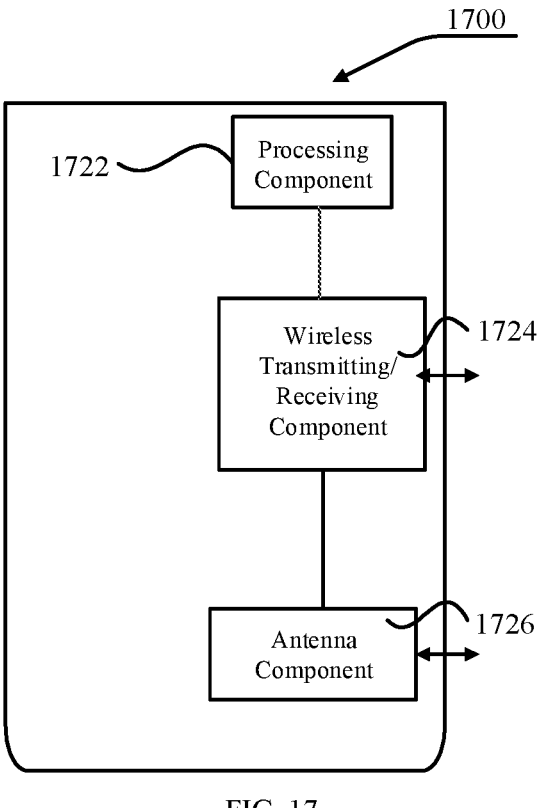
FIG. 17 is a schematic block diagram illustrating a device 1700 for TRS/CSI-RS configuration.

As shown in FIG. 17, FIG. 17 is a schematic block diagram illustrating a device 1700 for TRS/CSI-RS configuration. The device 1700 may be provided as a base station. Referring to FIG. 17, the device 1700 includes a processing component 1722, a wireless transmitting/receiving component 1724, an antenna component 1726, and a signal processing portion specific to a wireless interface. The processing component 1722 may further include one or more processors. One of the processors in the processing component 1722 may be configured to implement a TRS/CSI-RS configuration method according to any of the embodiments as described above.

Figure 18:
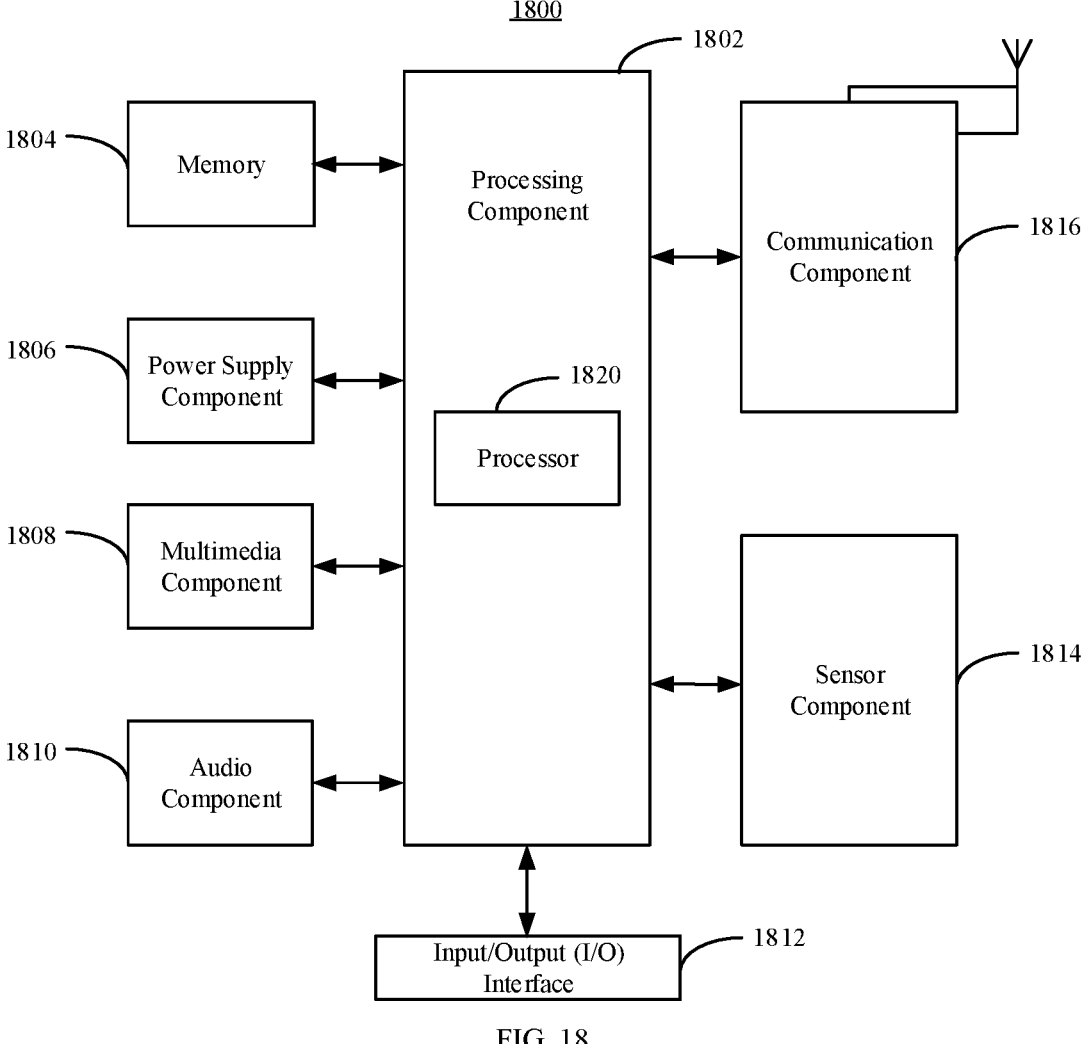
FIG. 18 is a schematic block diagram illustrating a device 1800 for TRS/CSI-RS configuration.

FIG. 18 is a schematic block diagram illustrating a device 1800 for TRS/CSI-RS configuration. For example, the device 1800 may be a mobile phone, a computer, a digital broadcast terminal, a message transmitting and receiving device, a gaming console, a tablet device, a medical device, a fitness device, a personal digital assistant, and the like.

Referring to FIG. 18, device 1800 may include one or more of the following components: a processing component 1802, a memory 1804, a power supply component 1806, a multimedia component 1808, an audio component 1810, an input/output (I/O) interface 1812, a sensor component 1814, and a communication component 1816.

The processing component 1802 usually controls overall operations of the device 1800, such as operations related to display, a telephone call, data communication, a camera operation and a record operation. The processing component 1802 may include one or more processors 1820 to execute instructions to complete all or a part of the steps of the above TRS/CSI-RS configuration methods. In addition, the processing component 1802 may include one or more modules which facilitate the interaction between the processing component 1802 and other components. For example, the processing component 1802 may include a multimedia module to facilitate the interaction between the multimedia component 1808 and the processing component 1802.

The memory 1804 is configured to store different types of data to support the operations of the device 1800. Examples of such data include instructions, contact data, phonebook data, messages, pictures, videos, and so on for any application or method that operates on the device 1800. The memory 1804 may be implemented by any type of volatile or non-volatile storage devices or a combination of the above, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 1806 provides power for different components of the device 1800. The power supply component 1806 may include a power management system, one or more power sources, and other components associated with generating, managing and distributing power for the device 1800.

The multimedia component 1808 includes a screen for providing an output interface between the device 1800 and a user. In some embodiments, the screen may include a Liquid Crystal Display (LCD) and a Touch Panel (TP) and so on. If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some embodiments, the multimedia component 1808 may include a front camera and/or a rear camera. When the device 1800 is in an operation mode, such as a shooting mode or a video mode, the front camera and/or the rear camera can receive external multimedia data. Each of the front camera and the rear camera may be a fixed optical lens system or have focal length and optical zooming capability.

The audio component 1810 is configured to output and/or input an audio signal. For example, the audio component 1810 may include a microphone (MIC). When the device 1800 is in an operating mode, such as a call mode, a recording mode and a speech recognition mode, the microphone is configured to receive an external audio signal. The received audio signal may be further stored in the memory 1804 or transmitted via the communication component 1816. In some embodiments, the audio component 1810 may also include a loudspeaker for outputting an audio signal.

The I/O interface 1812 provides an interface between the processing component 1802 and a peripheral interface module. The above peripheral interface module may be a keyboard, a click wheel, a button, or the like. These buttons may include but not limited to, a home button, a volume button, a start button and a lock button.

The sensor component 1814 includes one or more sensors for providing state assessments in different aspects for the device 1800. For example, sensor component 1814 can detect an open/closed state of device 1800, a relative positioning of components, such as the display and keypad of device 1800, and sensor component 1814 can also detect a change in position of device 1800 or a component of device 1800, the presence or absence of user contact with device 1800, orientation or acceleration/deceleration of device 1800, and temperature change of device 1800. The sensor component 1814 may include a proximity sensor for detecting the existence of a nearby object without any physical touch. The sensor component 1814 may also include a Complementary Metal-Oxide-Semiconductor (CMOS) or Charged Coupled Device (CCD) image sensor applied in an imaging application. In some embodiments, the sensor component 1814 may also include an acceleration sensor, a gyro sensor, a magnetic sensor, a pressure sensor, a temperature sensor, or the like.

The communication component 1816 is configured to facilitate wired or wireless communication between the device 1800 and other devices. The device 1800 may access a wireless network based on a communication standard, such as Wi-Fi, 2G or 3G, 4G LTE, 5G NR or a combination of the above. In an example, the communication component 1816 receives a broadcast signal or broadcast related information from an external broadcast management system via a broadcast channel. In an example, the communication component 1816 may also include a Near Field Communication (NFC) module to facilitate short-range communications. For example, the NFC module may be implemented based on a radio frequency identification (RFID) technology, an infrared data association (IrDA) technology, an ultra wide band (UWB) technology, a Bluetooth (BT) technology, and other technologies.

In an example, the device 1800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing a TRS/CSI-RS configuration method in any of the above embodiments.

In an example, a non-transitory computer readable storage medium including instructions, such as the memory 1804 including instructions, is also provided. The above instructions may be executed by the processor 1820 of the device 1800 to complete the above TRS/CSI-RS configuration method. For example, the non-transitory computer readable storage medium may be a Read-Only Memory (ROM), a Random Access Memory (RAM), a CD-ROM, a magnetic tape, a floppy disk and an optical data storage device, and so on.

A person skilled in the art can easily figure out another implementation solution of the disclosure after considering the specification and practicing the disclosure that is disclosed herein. The present disclosure is intended to cover any variations, uses, modification or adaptations of the present disclosure that follow the general principles thereof and include common knowledge or conventional technical means in the art that are not disclosed in the present disclosure. The specification and embodiments are considered as illustrative only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

It is to be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more restrictions, the elements defined by the sentence "including a . . . " do not exclude the existence of other identical elements in the process, method, product, apparatus or device including the elements.

The methods and apparatuses of the present disclosure are described above in detail. The principle and implementation of the present disclosure are described herein through specific examples. The description about the embodiments of the present disclosure is merely provided for ease of understanding of the method and core ideas of the present disclosure. Persons of ordinary skill in the art can make variations and modifications to the present disclosure in terms of the specific implementations and application scopes according to the ideas of the present disclosure. Therefore, the specification shall not be construed as a limit to the present disclosure.

The invention claimed is:

1. A Tracking Reference Signal/Channel State Information Reference Signal (TRS/CSI-RS) configuration method, performed by a base station, comprising:
   determining target configuration information from a plurality of pieces of preset TRS/CSI-RS configuration information, which comprises:
      according to a period of a Synchronization Signal Block (SSB) to be transmitted, determining the target configuration information corresponding to the period of the SSB from the plurality of pieces of preset TRS/CSI-RS configuration information;
   wherein the target configuration information is for configuring one or more TRSs/CSI-RSs for a terminal in a non-connected state; and
   transmitting the target configuration information to the terminal for instructing the terminal to receive the one or more TRSs/CSI-RSs based on the target configuration information in response to that the terminal is in the non-connected state.

2. The method according to claim 1, wherein the plurality of pieces of preset TRS/CSI-RS configuration information corresponds to a plurality of ports, the method further comprises:
   determining one or more target ports corresponding to the target configuration information; and
   based on the target configuration information, transmitting the one or more TRSs/CSI-RSs to the terminal in the non-connected state via the one or more target ports.

3. The method according to claim 2, wherein a number of the one or more target ports is a plurality, and
   wherein transmitting the one or more TRSs/CSI-RSs to the terminal in the non-connected state via the one or more target ports comprises:
   transmitting a plurality of TRSs/CSI-RSs to the terminal in the non-connected state via a plurality of target ports, to make a period for the terminal to receive the plurality of TRSs/CSI-RSs is shorter than a transmission period of any one TRS/CSI-RS.

4. The method according to claim 3, wherein moments for transmitting the plurality of TRSs/CSI-RSs are different.

5. The method according to claim 1, wherein determining the target configuration information from the plurality of pieces of preset TRS/CSI-RS configuration information further comprises:
   based on at least one of configuration requirements of the base station or capability information of the terminal, determining the target configuration information from the plurality of pieces of preset TRS/CSI-RS configuration information.

6. The method according to claim 1, wherein transmitting the target configuration information to the terminal comprises:
   in response to determining that the terminal enters the non-connected state from a connected state, transmitting the target configuration information to the terminal.

7. The method according to claim 1, wherein transmitting the target configuration information to the terminal comprises:
   transmitting the plurality of pieces of preset_TRS/CSI-RS configuration information to the terminal, wherein the plurality of pieces of preset_TRS/CSI-RS configuration information comprise activation information, and the activation information of the target configuration information is set to indicate activated.

8. The method according to claim 1, wherein the TRS/CSI-RS configuration information comprises at least one of:
   a port number corresponding to configuration information,
   a time domain resource of TRS/CSI-RS,
   a frequency domain resource of TRS/CSI-RS, or
   a period of TRS/CSI-RS.

9. A Tracking Reference Signal/Channel State Information Reference Signal (TRS/CSI-RS) configuration method, performed by a terminal, comprising:

receiving target configuration information transmitted by a base station, wherein the target configuration information is for instructing that one or more TRSs/CSI-RSs are configured in response to that the terminal is in a non-connected state, wherein the target configuration information is determined from a plurality of pieces of preset TRS/CSI-RS configuration information;

determining a target Synchronization Signal Block (SSB) to be received based on the target configuration information;

determining target time-frequency resources for receiving the target SSB based on preset SSB configuration information; and receiving the target SSB transmitted by the base station based on the target time-frequency resources.

10. The method according to claim 9, further comprising:

in response to being in the non-connected state, receiving the one or more TRSs/CSI-RSs transmitted by the base station based on the target configuration information.

11. The method according to claim 10, wherein a number of the target configuration information is a plurality, receiving the one or more TRSs/CSI-RSs transmitted by the base station based on the target configuration information comprises:

receiving a plurality of TRSs/CSI-RSs based on a plurality of pieces of target configuration information, wherein a period for receiving the plurality of TRSs/CSI-RSs is shorter than a transmission period of any one TRS/CSI-RS.

12. The method according to claim 9, wherein receiving the target configuration information transmitted by the base station comprises:

in response to determining to enter the non-connected state from a connected state, receiving the target configuration information transmitted by the base station.

13. The method according to claim 9, wherein receiving the target configuration information transmitted by the base station comprises:

receiving the plurality of pieces of preset_TRS/CSI-RS configuration information transmitted by the base station, wherein the plurality of pieces of preset TRS/CSI-RS configuration information comprise activation information; and in response to determining that activation information of first TRS/CSI-RS configuration information is set to indicate activated, determine the first TRS/CSI-RS configuration information as the target configuration information.

14. The method according to claim 9, wherein the target configuration information comprises at least one of:

a port number corresponding to configuration information, a time domain resource of TRS/CSI-RS, a frequency domain resource of TRS/CSI-RS, or a period of TRS/CSI-RS.

15. An electronic device, comprising:

a processor, and a memory storing instructions executable by the processor;

wherein the processor is configured to implement operations of:

determining target configuration information from a plurality of pieces of preset Tracking Reference Signal/Channel State Information Reference Signal (TRS/CSI-RS) configuration information, which comprises:

according to a period of a Synchronization Signal Block (SSB) to be transmitted, determining the target configuration information corresponding to the period of the SSB from the plurality of pieces of preset TRS/CSI-RS configuration information;

wherein the target configuration information is for configuring one or more TRSs/CSI-RSs for a terminal in a non-connected state; and transmitting the target configuration information to the terminal for instructing the terminal to receive the one or more TRSs/CSI-RSs based on the target configuration information in response to that the terminal is in the non-connected state.

16. A non-transitory computer readable storage medium storing a computer program, wherein the computer program is executed by a processor to implement operations of the TRS/CSI-RS configuration method according to claim 1.

17. An electronic device, comprising:

a processor, and a memory storing instructions executable by the processor;

wherein the processor is configured to implement the TRS/CSI-RS configuration method according to claim 9.

18. A non-transitory computer readable storage medium storing a computer program, wherein the computer program is executed by a processor to implement operations of the TRS/CSI-RS configuration method according to claim 9.

* * * * *